United States Patent [19]
Turtle et al.

[11] 3,884,079
[45] May 20, 1975

[54] FORCE BALANCE DIFFERENTIAL PRESSURE TRANSMITTER

[75] Inventors: Quentin C. Turtle, Cranston; Pasco A. Coia, Providence, both of R.I.; John R. Silva, Rehoboth, Mass.

[73] Assignee: General Signal Corporation, New York, N.Y.

[22] Filed: Nov. 5, 1973

[21] Appl. No.: 413,062

Related U.S. Application Data

[63] Continuation-in-part of Ser. No. 323,446, Jan. 15, 1973, abandoned.

[52] U.S. Cl. ............................... 73/398 R; 73/410
[51] Int. Cl. ............................................. G01i 9/10
[58] Field of Search ............... 73/398 R, 410, 516 R

[56] References Cited
UNITED STATES PATENTS

| | | | |
|---|---|---|---|
| 2,788,664 | 4/1957 | Coulbourn | 73/398 R |
| 2,853,287 | 9/1958 | Draper et al. | 73/516 R |
| 3,286,528 | 11/1966 | Jullien-Davin | 73/398 R |

*Primary Examiner*—Donald O. Woodiel
*Attorney, Agent, or Firm*—John F. Ohlandt; Jeffrey S. Mednick; Howard M. Cohn

[57] ABSTRACT

A differential pressure transmitter, including a gauge, which embodies a novel form of force-balance system that eliminates the need for levers, pivots and critical flexures. The system is designed for a wide range of differential pressure and utilizes a relatively strong magnet as part of the feedback motor such that the feedback coil of the motor can act directly upon the pressure sensing bellows at the input, the bellows being responsive to difference in pressure thereat.

5 Claims, 5 Drawing Figures

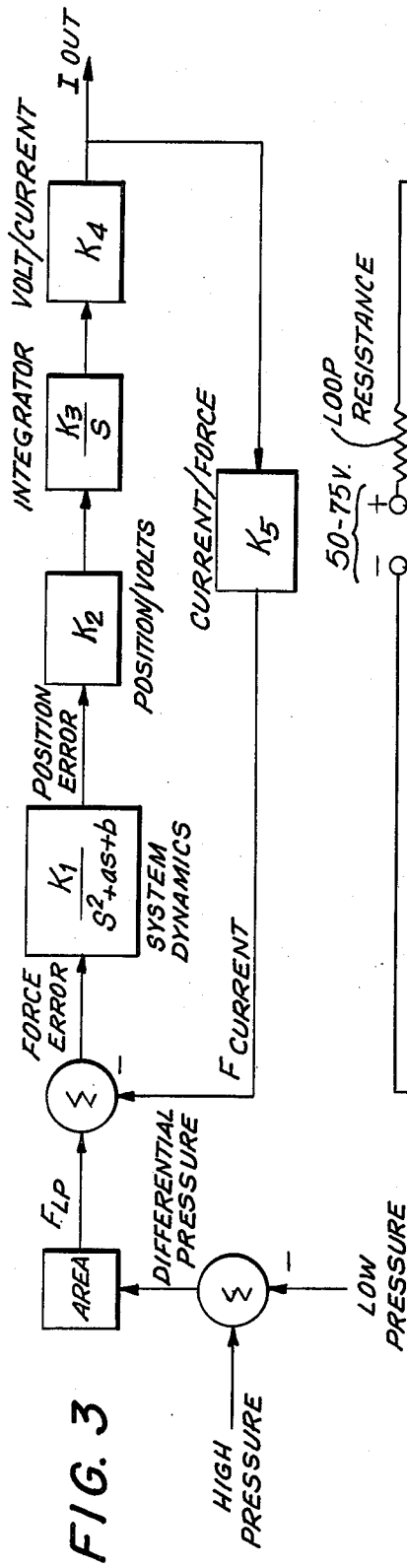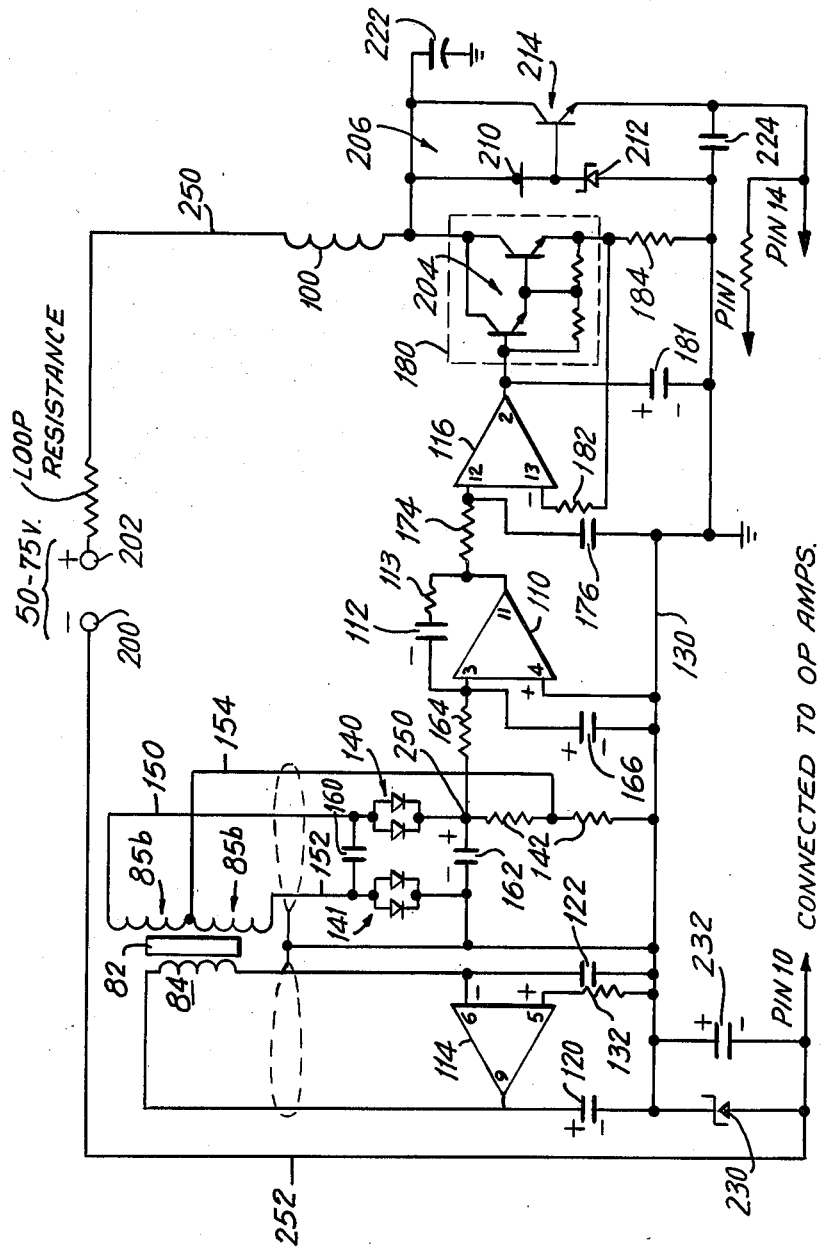
FIG. 3
FIG. 4

FORCE BALANCE DIFFERENTIAL PRESSURE TRANSMITTER

RELATED APPLICATION

This application is a continuation-in-part of application Ser. No. 323,446, filed Jan. 15, 1973 now abandoned. The benefit of such filing date for the parent application with respect to all common subject matter is herewith claimed.

BACKGROUND, OBJECTS AND SUMMARY OF THE INVENTION

This invention pertains to measuring systems of the force-balance kind and, more particularly, has for its central object the provision of a force-balance system that eliminates the need for levers, pivots and critical flexures.

A force-balance system is used in a differential pressure measuring device. Such device develops a milliampere current output signal which is directly proportional to the differential pressure imposed at the input of the system across a pressure sensing element, e.g. a bellows or the like.

It is well known that a very common method of producing an electrical force to re-balance the force that is exerted by the differential pressure is to excite the coil of a force motor (feedback motor) with a current whose polarity will cause a magnetic field to be established in such a way as to push the coil against the pressure differential force, thus restoring the system to balance. A specific example of this kind of measuring system can be appreciated by reference to U.S. Pat. No. 3,216,250 to Moreland.

A prerequisite of such measuring systems is a method of sensing the relative balance of the pressure force and the electrical force. In such systems, as in the Moreland patent, a relatively large force exerted by the diaphragm or bellows at the input may be substantially offset by the relatively small force exerted by a feedback coil if advantage is taken of the force multiplication realized through the use of a lever system.

The present invention recognizes the relative complexity of levers, and the inaccuracy associated therewith, in force-balance systems and, accordingly, has for its primary object the elimination of such levers.

The elimination of levers and the like is accomplished in accordance with the concepts of the present invention by providing an in-line design by which the feedback coil directly acts upon the pressure-sensing bellows. The in-line design is implemented by providing that the system function with all forces acting coaxially and by using a relatively strong magnet.

An ancillary feature of the pressure transmitter resides in the arrangement of the magnet poles, that is, the physical arrangement of the magnet poles is such that the external housing for the magnet becomes the return path for the magnetic flux. Not only does this arrangement itself provide a clearcut advantage but a bonus advantage accrues because of the fact that external magnetic disturbances to the magnet are significantly reduced.

Another aspect of the present invention is concerned with incorporating reset control action into the system. It turns out that in conventional control systems used in prior art under steady-state conditions some small position error signal must exist in order to support the output drive current, which actuates the force motor. The improvement contemplated for the control system of the present invention is that integral action as well as than proportional action be included in the circuit at the output from the error sensor. The benefit derived from integral action is that the need for a steady-state error is obviated. The integrator output supports the necessary drive to the current converter for maintaining an exact force balance at null position.

There are major advantages which accrue to the use of an integrator; for example, the non-zero control system error in the typical force-balance system can manifest itself as an inaccuracy due to variations in the sense element displacement over the input variable range. By incorporating an integrator the control system has a zero steady-state error characteristic thereby tending to eliminate any force error due to the sense elements spring rate. Moreover, the position detector, which takes the form of a linear variable differential transformer, will also create an inaccuracy, in a non-zero error system, if there is a variation in its location over the input variable range. The linearity characteristic of the detector will be directly reflected in the output signal. The control system with integrator eliminates this possibility because of its zero steady-state error characteristic. The system conversion from input differential pressure to output current will therefore be closer to the ideal.

In addition to improved system accuracy, there is zero volumetric displacement since the volume of fill fluid on either side of the sense element (bellows) will be maintained constant throughout the input variable range. This is so because the integral action insures that the sense element is always returned to the same neutral location. In addition, the integral action forces corrective response for the slightest error, so the magnitude of transient volumetric displacement is also minimized. As a result of the low volumetric displacement there is improved speed of response for the transducer; moreover, economy is effected in that small diameter piping can be used between the prime variable generator and the force balance transducer.

In yet another aspect the present invention is concerned with an improvement in the electronic instrumentation required in the operation of a differential pressure transmitter which is to be operable at a location remote from a usual source of power. More specifically, a feature of the present invention resides in a unique arrangement for deriving the bi-polar voltages required at the location of the sensing instrument (differential pressure gauge) from the signal current established in a two-wire line connected to a central power supply. In other words, the same two-wire supply that is designed to transmit current variations to suitable secondary equipment, as an indication of change in differential pressure, is also adapted to furnish the necessary bi-polar voltages.

Further objects, features and advantages of the present invention will be understood by reference to a detailed description taken in conjunction with the accompanying drawing.

BRIEF DESCRIPTION OF THE DRAWING

FIG. 3 is a control system block diagram illustrating the incorporation of an integrator into the feedback loop.

FIG. 4 is a schematic diagram of the electronics of the control system.

DESCRIPTION OF PREFERRED EMBODIMENT

Figure 1:
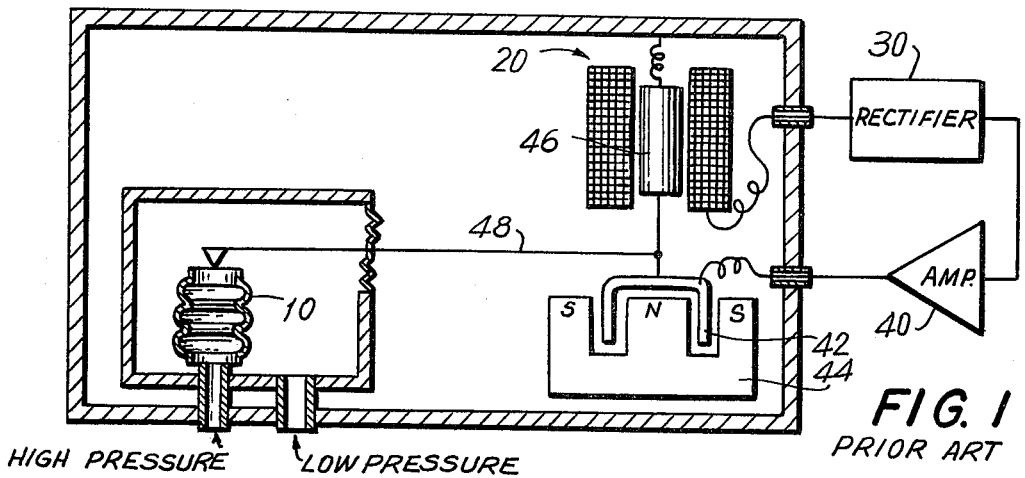
FIG. 1 is a diagrammatic illustration of a force-balance system known in the prior art.

Referring now to the figures, and for the moment to FIG. 1, the operation of a force-balance system generally known in the prior art will be appreciated. A differential pressure is applied to the inlets marked "high pressure" and "low pressure" so that as the pressure differential increases, the bellows 10 is forced upwards, thereby lengthening the bellows. This change in system balance is sensed by a linear variable differential transformer designated 20, whose output is an electrical signal. This electrical signal is rectified by rectifier 30 and amplified by amplifier 40. The resulting current from amplifier 40 is then applied to a force coil 42 whose length is immersed in a gap of a magnetic field produced by the permanent magnet 44.

The electromagnetic field thus produced by the current flowing through coil 42 forces the coil out of the gap of magnet 44, thereby restoring core 46 of the linear variable differential transformer 20. This results, through the operation of the lever system 48 in restoring the pressure sensing bellows 10 to approximately their original position. It should be noted however that with this change in pressure a new balance condition exists. In other words, the described follow-up movement produces variable, small error signals in proportion to the incremental change in pressure differential.

Whether the system be of the kind specifically illustrated in FIG. 1 or of other similar kinds, such as that disclosed in the Moreland patent previously referred to, the result is that a relatively large force exerted by the bellows or other input device is re-balanced by taking advantage of force multiplication through the use of a lever system such as the lever 48 in FIG. 1.

Figure 2:
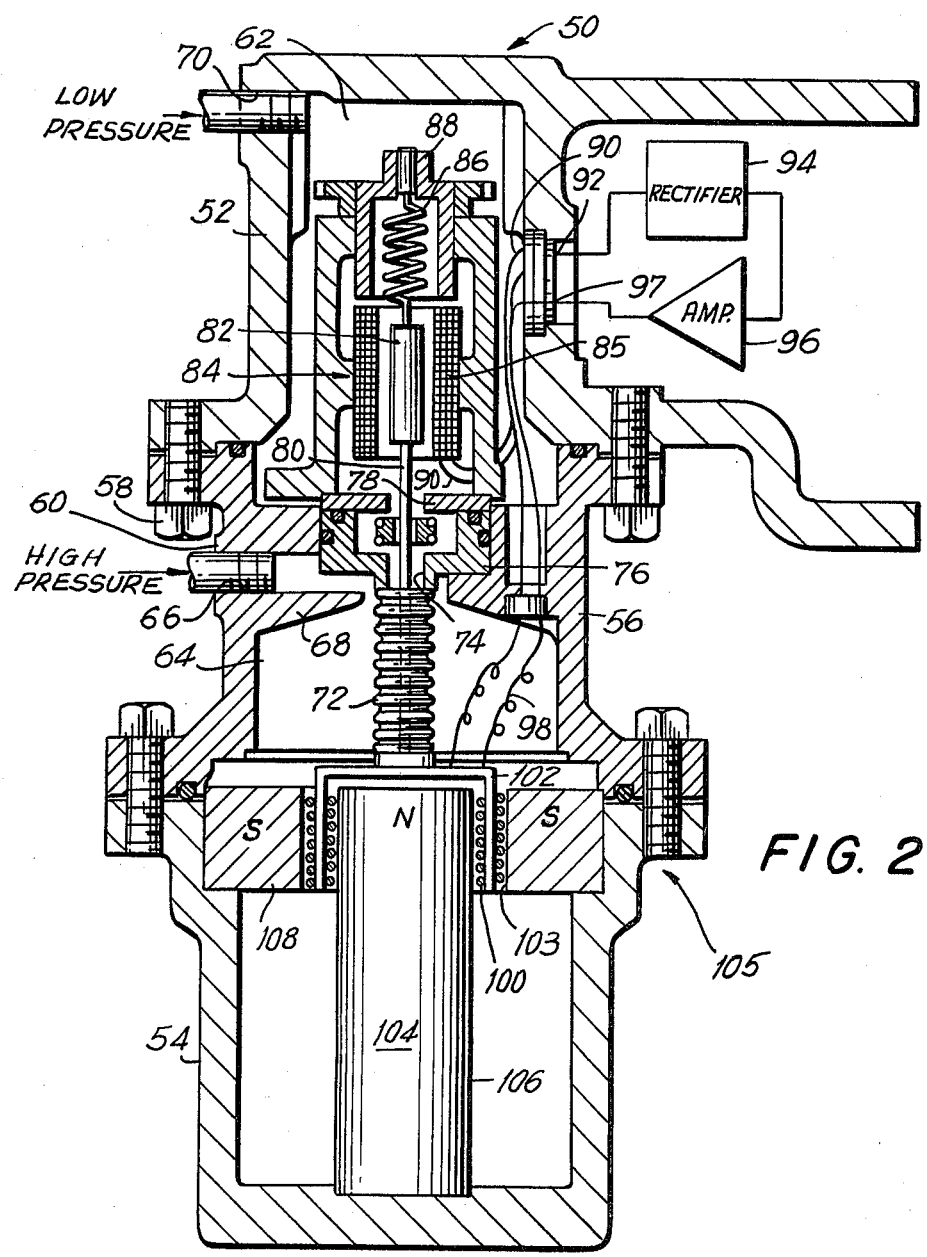
FIG. 2 is an elevational view, partly in section, of a pressure transmitter embodying a preferred form of force-balance system in accordance with the present invention, and including the electronics in block form.

Referring now to FIG. 2, a preferred embodiment of the present invention is therein illustrated, including the electronics portion in simplified or block form. The differential pressure transmitter of the invention is housed in a casing 50 comprising an upper portion or cap 52 of substantially cylindrical configuration and open at one end, and a lower portion or cap 54, open at one end and likewise of substantially cylindrical configuration. A middle portion or section 56 is disposed between the open ends of the two portions 52 and 54. The three housing sections, 52, 54 and 56 are in coaxial alignment with each other and are affixed to each other by any suitable means such as, for example, by bolts 58.

A partition 60 is arranged substantially perpendicularly to the axis of the housing sections and is effective to divide the interior of the casing into two pressure chambers 62 and 64. A passage 66 for the purpose of admitting fluid at a relatively high pressure to the lower chamber 64 is defined by the partition 60 and a radially inwardly directed flange 68. A corresponding opening or passage 70 is provided at the upper end of the casing for the purpose of admitting fluid at a low pressure to the upper chamber 62.

A pressure sensing bellows 72 is disposed in the lower pressure chamber 64 and seals this pressure chamber by reason of the connection at its upper end to safety device 76 so as to surround an aperture 74 in this device. A further aperture 78 is provided in this device such that the pressure of the upper chamber 62 is communicated to the interior of the bellows 72.

Displacement of the bellows 72 is transmitted directly by way of rod 80 to a core 82 of a differential transformer or generating means 84. A bias force is supplied to the rod 80 by spring means 86 having its upper end received in yoke 88.

The differential transformer 84 includes a coil or winding assembly 85 comprising a pair of secondary windings, connected series opposing, and a primary winding energized from a suitable source of current. Since this kind of differential transformer is well known in the art, the details of its construction are not considered essential to a description of the present invention. However, electrical connection is shown from the secondary windings of transformer 84 by way of conductors 90 to a pressure sealing terminal 92. Connection is then made to rectifier 94, as indicated schematically, the output of rectifier 94 being connected to amplifier 96. The output of amplifier 96 is returned to a pressure terminal 97, being connected by way of the conductors 98 to the coil or winding 100. Coil 100 is carried by a sleeve 102 which is affixed to the bottom end of the bellows 72. The coil 100 is part of a moving coil or electrodynamic system, that is to say, the coil 100 is disposed on the sleeve 102 for movement in high reluctance gap 103 of the magnet assembly 104, which comprises the pole pieces 106 and 108. A closed path for the magnetic circuit is established by means of the lower portion 54 of the casing, which portion is constituted of magnetic material.

The pressure cell or gauge of the present invention operates in a unique manner to measure an input differential pressure. This is because of the provision of direct action between the movement of the coil 100 and the pressure sensing bellows 72. This in-line relationship, as can be seen in FIG. 2, between the coil carrying sleeve 102 and the bellows 72 does require more force from the coil 100 than has been required before in previous designs. However, the added force requirement is fulfilled by the design of the force motor 105, comprising the magnet assembly 104 and the coil 100, such that it has a sufficient magnetic field to provide the necessary force through the coil motion when current is made to flow through the coil 100. It has been found in applications of the present invention that a magnetic flux density of approximately 5000 gauss in the high reluctance gap is sufficient in typical cases where a range of input differential pressures from 0 to 3.6 pounds per square inch are encountered.

As will be understood, the differential pressure is imposed across the pressure sensing bellows 72 when the individual pressures to the chambers 62 and 64 are different. The low pressure in the upper chamber 62 is transmitted to the interior of the bellows 72 by way of the apertures 78 and 74 in safety device 76. The length of the bellows 72 varies initially, during the transient, in accordance with the pressure differential. As a consequence, for example as the bellows shorten, such as occurs when the differential pressure increases, the core 82 of transformer 84 is moved upwardly reducing the bias of spring 86. The upward movement of the core results in an output signal which is applied at the input to the rectifier 94. The rectified output signal is then amplified by amplifier 96 and transmitted by means of conductor 98 to the coil 100. The coil 100 is moved in the gap by an amount substantially the same as the original movement of the core 82, but in the opposite direction; that is, downwardly in this case, to restore the bellows substantially to its original position. The difference between the two movements represents the small offset needed to produce an error signal sufficient to maintain the system in a stabilized or steady-state condition. It will be understood, however, that the production of an error signal is necessary only in a type "0" control system involving proportional action; and that where reset or integral action type "1" is involved, as is preferably the case in the electronic circuitry portion of the measuring system to be described, no error signal exists after the transient dies out and steady-state conditions have been established.

It will be appreciated that the direct action of the restoring force provided by the coil 100 upon the pressure sensing bellows results in extremely high accuracy because of the elimination of pivots and their frictional characteristics and the elimination of pivoting flexures with their alignment difficulties.

The electronic aspects of the present invention have been illustrated in simplified form in FIG. 2, wherein, for the sake of simplicity, only the feedback loop to the force coil 100 has been illustrated; moreover, as just mentioned, the integrating function has not been specifically shown therein. However, reference to FIG. 4 will make clear the details of the reset control or integration feature of the present invention, but reference should first be made to the control system block diagram of FIG. 3, in which is illustrated the incorporation of an integrator into the system following the position error device, that is, the block designated $K_2$, and just prior to the block designated $K_4$. As indicated previously, the integrator insures that the sense element is always returned to the same neutral location. In other words, the integrator output provides the necessary drive to the current converter to supply sufficient current to the force coil so as to maintain an exact force balance.

The implementation of the integrator shown in block form in FIG. 3 may be appreciated by reference to FIG. 4. There will be seen in the schematic diagram of FIG. 4 an integrating operational amplifier 110 which includes a feedback capacitor 112. Such an operational amplifier is but part of an integrated semiconductor "chip" which also includes the operational amplifiers 114 and 116. Such a chip is available from the Siliconix Corporation and is designated L143 or L144.

It will be noted that operational amplifier 114 is connected in the primary winding circuit of the linear variable differential transformer 84, previously shown in FIG. 2. Correspondingly, the core 82 and the winding assembly 85 corresponds with those respective components in FIG. 2. By reason of suitable connection of the capacitors 120 and 122 to the common busbar 130 and the respective pins 9 and 6 (minus input) of the operational amplifier 114 and further by reason of the connection of the primary winding of the differential transformer 84 to those same pins, the amplifier 114 functions as a Colpitts oscillator which resonates at a frequency of approximately 2 kilohertz. It will also be noted that pin 5 (plus input) of the operational amplifier 114 is connected through resistor 132 to the common busbar 130.

The secondary circuit of the differential transformer 84 includes a pair of secondary windings, series connected in a balanced circuit arrangement comprising pairs of rectifying diodes 140, 141 and balanced resistors 142. Connections are made from the ends of the secondary windings by the leads 150 and 152. Connections are also made by way of the line 154 from the center point of the secondary windings to the center point between the equally valued resistors 142. Capacitor 160 is connected across the ends of the secondary windings, and capacitor 162 is connected across the outputs of the pairs of rectifiers 140, 141 and also, by way of the resistor 164, to pin 3 (minus input) of the integrating operational amplifier 110. For purposes of stabilization, i.e. to prevent spurious oscillations, capacitor 166 is connected to this same input and to the common busbar 130. The other input (the plus input) at pin 4 is directly connected to busbar 130.

As a result of the balanced arrangement in the secondary circuit the operational amplifier 110, which, as is well known, is basically a difference amplifier, will respond to differences in potential at its two inputs to provide an output signal. The output of amplifier 110 (at pin 11) is connected through the resistor 174 to pin 12 (plus input) of operational amplifier 116 and this input is also connected through the stabilizing capacitor 176 to the common busbar 130. The output of amplifier 116, in addition to being connected to the input of power output stage 180 is also connected through stabilizing capacitor 181 to the common busbar. A feedback path is provided from the emitter follower output of stage 180 to the pin 13 (minus input) of amplifier 116 by way of the resistor 182. The feedback connection is made at the top of load resistor 184 whose other end is connected to the common busbar. The requisite voltage to be fed back is, of course, derived from the output current flowing through resistor 184. Conveniently, the value of this resistor is 50 ohm where the output current range is 4–20 ma; on the other hand, the value is 20 ohms where an output current range of 10–50 ma is to be handled.

The unique arrangement for supplying bi-polar voltages will be understood from the schematic diagram of FIG. 4. It will be seen that there are two terminals 200 and 202 at the top of the diagram which connect to a suitable transmission line connected to a remote power supply which supplies a voltage in the range of 50–75 volts. Thus, the same transmission line, which is connected to these terminals so as to transmit the variation in current signal as the differential pressure changes, also functions to provide from the remote supply, the needed supply voltages for the several amplifiers illustrated in FIG. 4. These amplifiers are the operational amplifiers 110, 114 and 116. Bi-polar voltages are required for these amplifiers and it is highly desirable that the requisite voltages be supplied from a remote central station rather than locally, i.e., where the differential pressure is being sensed.

In implementing the objective of obtaining the desired bi-polar voltages good regulation of these voltages is required. Thus, referring to FIG. 4 it will be seen that at the power output stage 180, that is, at the output of the Darlington connected transistor pair 204, there is connected a power supply arrangement 206, including a current regulating diode 210 and in series therewith a zener diode 212. The zener diode has its cathode connected to the base of a transistor 214 with its other end being connected to busbar 130. The collector of transistor 214 is connected to the anode of the current regulation diode. The purpose of the current regulating diode 210 is to insure that the zener diode 212 operates within prescribed current limits to supply the required well-regulated voltage across its terminals. As a result, the voltage from base to emitter of transistor 214 will be similarly well regulated with the result that a positive voltage supply, approximately 7.0 volts, is available at common pin 14 for the several operational amplifiers, i.e., amplifiers 110, 114 and 116. By use of the dropping resistor 220 a slightly reduced positive voltage supply is available at pin 1 of the aforesaid amplifiers for establishing a predetermined operating point. It will be noted that suitable capacitors 222 and 224 are also provided in this half of the voltage regulating circuit.

The other half of the required bi-polar voltage will be seen at the lower left portion of the diagram (FIG. 4). Thus, the negative voltage required is furnished by connection of zener diode 230 to negative terminal 200. It has been found that use of the zener diode 230 without additional regulating elements is satisfactory. It will be noted that capacitor 232 is connected across zener diode 230. It will be appreciated that as a result of the zener diode connection there is available at pin 10 the requisite negative voltage supply, approximately 7 volts, for the operational amplifiers.

The operation of the electronics portion of the control system will now be explained. As indicated previously, the primary side of the differential transformer 84 is supplied with oscillations from the Colpitts oscillator already defined. These oscillations exist regardless of the position of the core 82. The result when the core is in a neutral or null position is that equal AC voltages are induced across the two secondary windings. Therefore, the half wave components of the two voltages appearing at the output of the demodulators 140 and 141 are equal; consequently, the average value of voltage is zero between the point designated 250 (at the top of the pair of resistors 142) and the common busbar 130. Accordingly, there are zero volts DC across capacitor 162.

Let it be assumed that the core 82 subsequently moves upwardly from the null position, then the voltage induced across the upper secondary winding is increased in value so that the average value measured between the point 250 and the common busbar is a negative value of DC voltage. Therefore, the integrating operational amplifier 110 "sees" this negative value of DC voltage. As indicated previously, amplifier 110 functions by means of the feedback capacitor 112 in conjunction with resistor 164 to provide a suitable time constant, thereby enabling integrating or reset action. In the event that selectivity of control mode is desired, that is to say, if one wants, for example, to introduce proportional action in combination with integral action, then a resistor 113 is included in the feedback path of amplifier 110 and a suitable value therefor is chosen. However, if only proportional action is desired as may be the case during start-up or recalibration, then capacitor 112 is removed from the circuit.

The operational amplifier 116 functions to provide DC voltage gain and accordingly operates to amplify the voltage signal appearing at the output of operational amplifier 110. This amplifier 116 includes its own emitter follower output; however, requisite power amplification is provided by the compound or Darlington connected transistor pair comprising the output stage 180. The output from the stage 180 is effective to control the current signal (output current) in the loop defined by conductor 250 and in which force coil 100 is connected. The return path for the loop is defined by conductor 252, seen on the left. The current signal which is demanded in the loop by the assumed core movement, and hence changed condition at the integrating operational amplifier, results in movement of the force coil in a direction to oppose the initial movement of the core 82 so as to bring the core back to its null position.

Correspondingly, if it is assumed that the core 82 moves downwardly, rather than upwardly as first posited, then the voltage induced across the lower secondary winding is increased in value so that the average value at the input to amplifier 110 is a positive DC voltage. The final consequence of this is that the current signal in the loop is such as to produce movement of the coil 100 in opposition to the initial downward movement of the core 82; therefore, again, bringing the core back to its null position.

Figure 5:
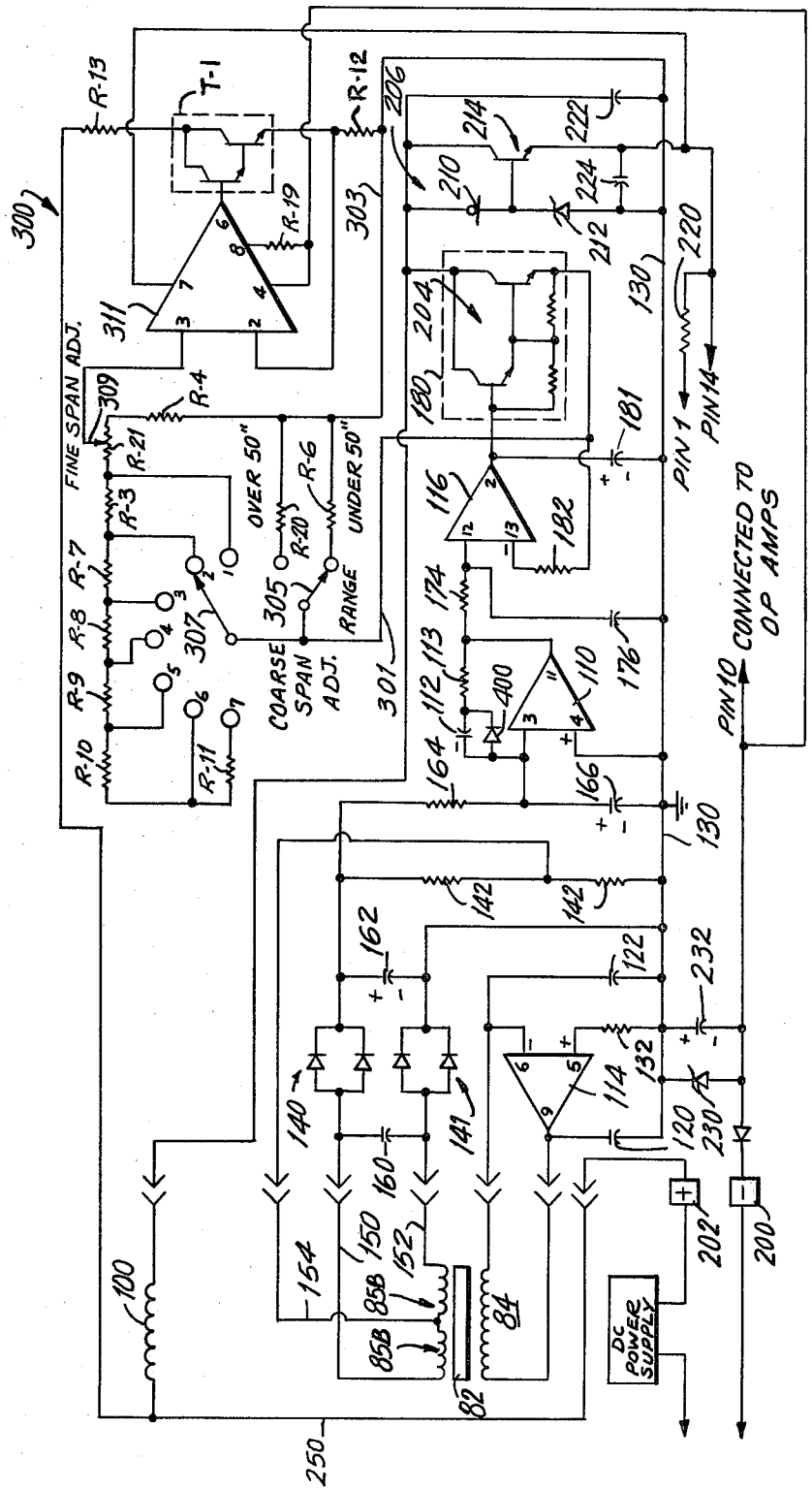
FIG. 5 is a schematic diagram of a modified form of electronics for the control system.

Referring now to FIG. 5, this is a schematic diagram of a modified form of electronics for the control system. This diagram includes substantially all of the elements or components previously illustrated in FIG. 4 and like numerals refer to like parts in both figures.

It will be seen in FIG. 5, at the upper right-hand portion thereof, that a range adjustment circuit has been provided. The addition of this circuit allows for an exact adjustment on the system output current throughout a specified range of input differential pressures and production variations in critical components (such as bellows and magnet assemblies).

The basic closed-loop system signal is available on lead 301 as a voltage developed across range adjustment resistor R—6 or R—20 which essentially replace R—184 of FIG. 4. Selector devices 307 and 309 provide a coarse and fine potentiometric adjustment which interfaces the closed loop voltage signal with a voltage-to-current converter consisting of amplifier 311, Darlington transistor T—1, and feedback resistor R—12. The converter output current which flows through R—13 is in parallel with and proportional to the closed loop current which flows through force coil 100. It can, therefore, be seen that the system output current which flows through terminals 202 and 201 is a combination of the force coil current and a bypass current proportional to same. The proportion is adjustable by virtue of range adjustment 305 and coarse and fine selectors 307 and 309 to provide an exact current output range, such as 4–20 milliamperes.

It will also be seen in FIG. 5, in connection with the operational amplifier 110, that a diode 400 has been included in parallel with capacitor 112. The addition of this diode overcomes an inadequacy of the system to adjust to an inadvertent, reverse differential pressure signal. The diode 400 prevents integrating capacitor 112 from charging in a reverse polarity as would occur if the higher of the applied pressures occurred at low pressure passage 70 of FIG. 2. Since capacitor 112 cannot charge negatively due to the shorting action of diode 400 for that polarity, the system will respond instantaneously to the properly applied differential pressure signal. In the absence of diode 400, a reverse charge on 112 would require a substantial discharge time prior to the resumption of normal operation after the application of a reverse differential signal and subsequently the correct differential pressure signal.

What is claimed is:

1. A force-balance differential pressure transmitter, comprising:
   a casing having first and second pressure chambers therein;
   a pressure sensing device for measuring the difference in pressure between the two chambers, said device having an initial position;
   a linear variable differential transformer including a core movable in response to movement of said pressure sensing device;
   feedback means, including a feedback coil for receiving current derived from said transformer, said coil being operable to restore said pressure sensing device substantially to its initial position;
   a common direct current power supply and a two-wire transmission line or loop connected to said power supply, including means for both transmitting signal current over the transmission line to a central station and for deriving bi-polar voltages serving as local power supplies at the location for said differential pressure transmitter.

2. Apparatus as defined in claim 1, further comprising:
   amplifying means in said feedback means, and means for supplying said bi-polar voltages to said amplifying means.

3. Apparatus as defined in claim 2, further comprising a power output stage and a feedback path in said power output stage, and potentiometer means for adjusting to the output current range to be handled.

4. A force-balance differential pressure transmitter, comprising:
   a casing having first and second pressure chambers therein;
   a pressure sensing device for measuring the difference in pressure between the two chambers, said device having an initial position;
   a linear variable differential transformer including a core movable in response to movement of said pressure sensing device;
   feedback means, including amplifying means and a feedback coil for receiving current derived from said transformer, said coil being operable to restore said pressure sensing device substantially to its initial position;
   integrating means as part of said feedback means, said integrating means comprising a capacitor and resistor in series and connected between the input and output of said amplifying means.

5. Apparatus as defined in claim 4, further including a diode connected in shunt with said capacitor.

* * * * *